Figure 1:
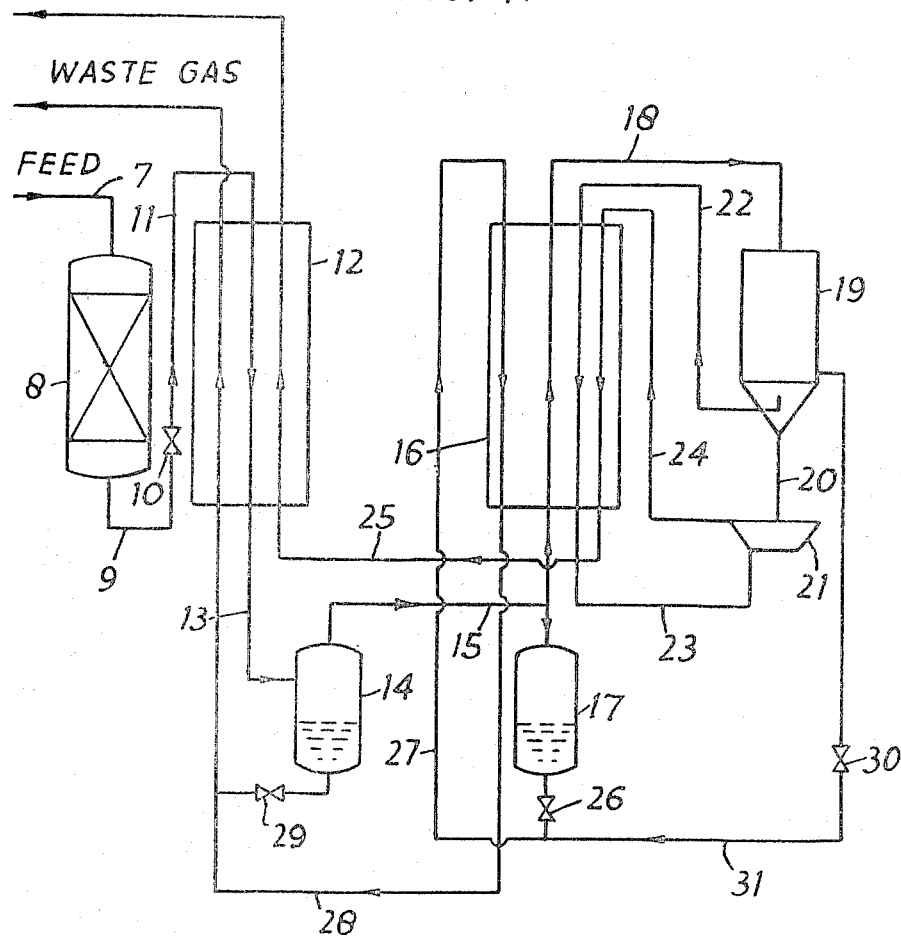

United States Patent

Ruhemann et al.

[15] 3,643,452
[45] Feb. 22, 1972

[54] RECOVERY OF GASES

[72] Inventors: Martin Siegfried William Ruhemann, Brooklands; Stanley Mercer, Manchester, both of England

[73] Assignee: Petrocarbon Developments Limited, Manchester, England

[22] Filed: Aug. 20, 1969

[21] Appl. No.: 851,705

[30] Foreign Application Priority Data

Aug. 20, 1968 Great Britain...............39,734/68

[52] U.S. Cl..............................62/22, 62/23, 62/39, 62/40, 233/24, 62/499
[51] Int. Cl..............................F25j 3/00, F25j 3/08
[58] Field of Search............62/8, 11, 22, 23, 24, 38, 39, 62/499; 55/52, 55, 66; 233/23 R, 24, 25

[56] References Cited

UNITED STATES PATENTS

| | | | |
|---|---|---|---|
| 379,690 | 3/1888 | De Laval | 233/24 |
| 1,124,715 | 1/1915 | D'Olier | 233/24 |
| 2,720,313 | 10/1955 | Pattison | 233/24 |
| 3,057,167 | 10/1962 | Yendall | 62/22 |
| 3,126,266 | 3/1964 | Meisler | 62/23 |
| 3,160,490 | 12/1964 | Fabre | 62/38 |
| 3,205,669 | 9/1965 | Grossmann | 62/38 |
| 3,251,542 | 5/1966 | Newgard | 62/23 |
| 3,358,460 | 12/1967 | Smith | 62/38 |
| 3,363,428 | 1/1968 | Charlesworth | 62/39 |
| 3,433,027 | 3/1969 | Charlesworth | 62/39 |

FOREIGN PATENTS OR APPLICATIONS

| | | | |
|---|---|---|---|
| 602,388 | 3/1926 | France | 233/24 |
| 697,082 | 1/1931 | France | 233/24 |
| 1,113,909 | 9/1961 | Germany | 233/24 |
| 704,523 | 5/1931 | France | 62/499 |

*Primary Examiner*—Norman Yudkoff
*Assistant Examiner*—Arthur P. Purcell
*Attorney*—Browdy and Neimark

[57] ABSTRACT

A light gas, namely hydrogen or helium, of increased purity is obtained from a gaseous mixture consisting predominantly of the light gas by passing the mixture through a rotating gas centrifuge under conditions such that gaseous impurities are condensed and a light gas stream of increased purity is recovered. The process may be applied to a light gas concentrate obtained from a gaseous mixture by separation of the constituents other than the light gas by low-temperature condensation, in which case a gas expansion turbine used to produce refrigeration for the process may be used to drive the gas centrifuge.

9 Claims, 3 Drawing Figures

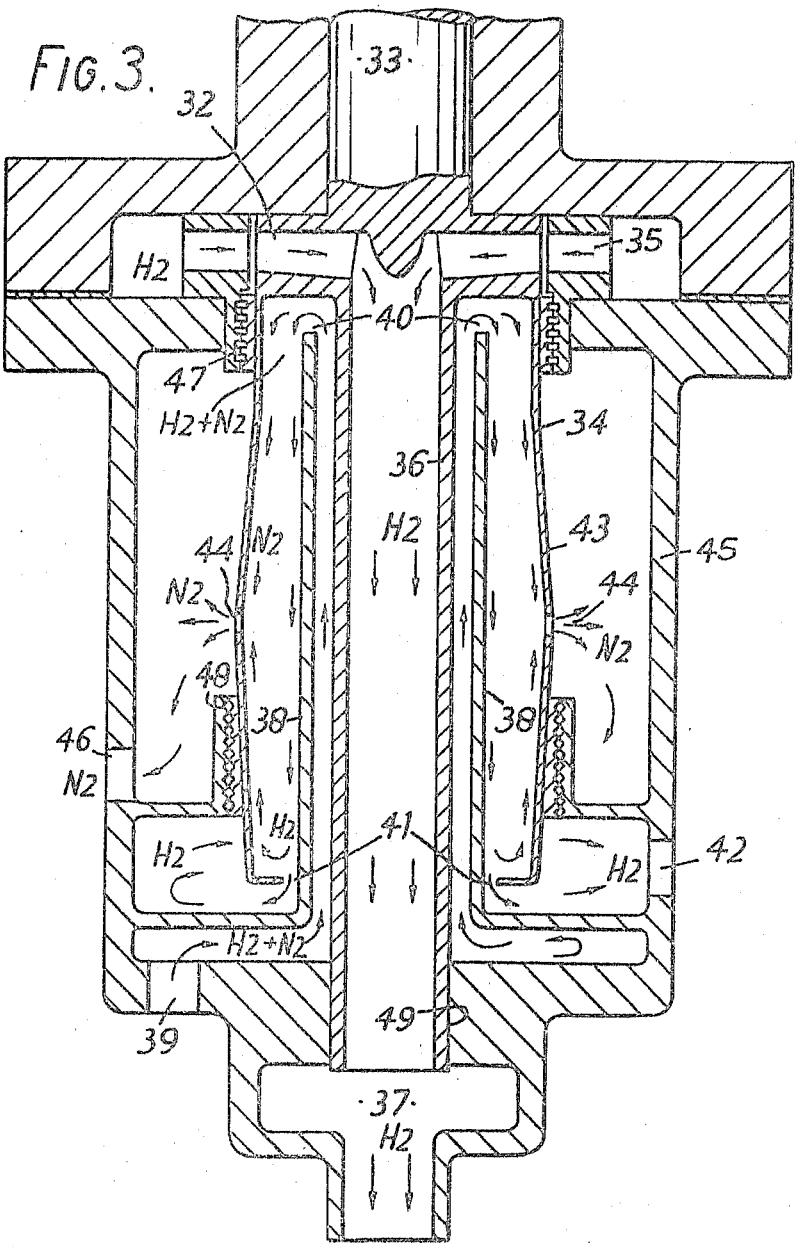

RECOVERY OF GASES

This invention is concerned with the recovery of one of the light gases, namely hydrogen and helium, from gaseous mixtures containing the light gas and one or more other gases which can be separated therefrom by condensation at low temperatures.

It is primarily concerned with the recovery of a light gas from a gaseous mixture consisting predominantly of the light gas, i.e., containing 90 percent or more by volume of the light gas.

Available sources of hydrogen are the purge gases from synthetic ammonia plants and the off-gases from oil refinery and petrochemicals plants. Sources of helium are helium-bearing natural gases and waste gas streams from industrial processes, e.g., fertilizer producing processes, using such natural gases.

As is well known hydrogen or helium concentrates may be recovered from mixtures such as are referred to above by the condensing out at low temperatures of other gases present. Such other gases usually include nitrogen and may also include one or more of argon, carbon monoxide and hydrocarbon gases such as methane. Low-temperature condensation processes for the recovery of hydrogen are described, for example, in British Pat. Nos. 1,057,020 and 1,136,040.

There are, however, limitations of the purity of the light gas recovered by a low-temperature condensation process carried out in the temperature range in which the process can be operated. Thus the maximum purity of hydrogen obtainable by such a process is about 98 percent by volume and similarly for helium the maximum purity obtainable in practice is of the same order.

For certain industrial processes hydrogen and helium of a purity higher than that obtainable by the normal low-temperature processes are required. Thus, for example, hydrogen of a very high purity is required for the hydrogenation of fats and oils and for nickel refining. Helium of a very high purity is required for cryogenic purposes, e.g., for the testing of superconducting mechanisms and as cooling streams in nuclear plants.

Apart from the requirement of a product of high purity for subsequent use by the consumer, there are advantages in producing such a product for use in gas expansion turbines which may advantageously be used to product refrigeration for the low-temperature condensation process. Thus a highly pure product which is produced at an elevated pressure may be expanded through a gas expansion turbine to obtain the low temperature desired without liquid formation taking place in the turbine as may occur when using the normal product of a low-temperature condensation process. Thus the availability of a hydrogen or helium product of very high purity, e.g., 99 percent or more by volume, would improve the efficiency and operability of low temperature condensation processes using gas expansion turbines to produce refrigeration.

Adsorption processes using activated charcoal, activated alumina or molecular sieves at low temperatures are known which will yield hydrogen or helium of a purity in excess of 99 percent by volume. Also it is known to recover hydrogen of a high degree of purity by diffusion through palladium or other porous metals. However, the known adsorption and diffusion processes and plant are complex and even when used as an adjunct to a low-temperature condensation process, are costly.

Accordingly, there exists a need for a more economical and simple process and plant than those at present available for the recovery of helium and hydrogen of very high purity.

It is an object of the invention to provide an improved process and means for the recovery of hydrogen or helium of a purity in excess of that obtained by the known low-temperature condensation processes, from gaseous mixtures consisting predominantly of hydrogen or helium, and primarily from the hydrogen or helium concentrate product of a low-temperature condensation process.

In accordance with the invention, a hydrogen or helium of increased purity, is obtained from a mixture of gases consisting predominantly of hydrogen or helium by introducing the mixture of gases into the central portion of a rotating gas centrifuge under such conditions of temperature and pressure that the introduced mixture is above its dew-point, but passes through its dew-point as it is caused by centrifugal force to pass to the peripheral wall of the centrifuge, the temperature being maintained substantially constant throughout the centrifuge. This results in liquid droplets of constituents other than the hydrogen or helium forming somewhere between the center of the centrifuge and its peripheral wall or at the peripheral wall itself where the liquid gathers to form a film. The residual gas forms the product stream and is recovered.

It is, or course, known that gases of different atomic weights can be separated to some extent in a gas centrifuge, but the use of a gas centrifuge does not by itself solve the problem of further purifying the hydrogen or helium since it merely divides the gas stream into parts of relatively slightly differing composition. Thus if a mixture containing 98 percent $H_2$ were to be introduced into the centrifuge and no condensation took place therein, a small stream containing 99 percent or over of hydrogen could be withdrawn from the center but a much larger stream would have to be withdrawn from the circumference with a hydrogen content of say 96 percent. To obtain a better yield of high purity hydrogen, a multistage centrifuge would have to be used and the provision of such a multistage apparatus would be complicated and expensive.

We have found, however, that advantage can be taken of the change in hydrogen concentration as well as the pressure gradient between the center and outer circumference of the centrifuge which are established during the operation of the centrifuge.

If a binary perfect gas mixture is rotated in a centrifuge, the relationship between the concentrations of one of the components at different radii is expressed by the equation:

$$\alpha = \frac{x'(1-x'')}{x''(1-x')} = e^{(M_2 - M_1)W^2(r''^2 - r'^2)/2RT}$$

where $x'$ and $x''$ are the molfractions in the mixture of the lighter component (i.e., $H_2$) at radius $r'$ and $r''$ (in cm.) respectively, $e$ is the basis of natural logarithms, $M_1$ and $M_2$ are the molecular weights of the lighter and heavier components respectively (i.e., 2 for $H_2$ and 28 for $N_2$), $W$ is the angular velocity of rotation of the centrifuge (radians/second), $R$ is the universal gas constant ($= 8.31 \times 10^7$ ergs/°) and $T$ is the absolute temperature of the gas. $\alpha$ is known as the Separation Factor.

Using a cylindrical centrifuge of 43 mm. diameter rotating at 100,000 revs. per minute (i.e., with an angular velocity of $1.05 \times 10^4$ radians/second) and containing a mixture of hydrogen and nitrogen at 70° K., it is found that the expression on the right-hand side of the above equation has the numerical value 3.1, if $r'$ is given the value 0 as referring to the centerline of the centrifuge and $r''$ is given the value 2.15 cm. as referring to the rim.

Thus if a mixture containing 98 mol percent hydrogen and 2 mol percent nitrogen is introduced at the center of the centrifuge, the above equation will take the form:

$$\frac{0.98(1-x'')}{0.02(x'')} = 3.1$$

from which the hydrogen concentration $x''$ at the rim of the centrifuge is found to be 94.0 mol percent the nitrogen concentration being 6.0 mol percent.

Similarly it can also be shown by calculation that, if the pressure along the centerline of the centrifuge is 40 atm. abs. that at the circumference will be just over 45 atm. abs.

The method of the invention makes use of the change in composition of the hydrogen stream and the difference in pressure referred to, by introducing the hydrogen stream which is to be purified to the center part of the centrifuge at a pressure and temperature such that the hydrogen stream is just above its dew-point and passes through its dew-point as it is caused by centrifugal force to pass to the peripheral wall of the centrifuge, the temperature being maintained constant throughout the centrifuge. For example, an $H_2/N_2$ mixture containing 98% $H_2$ by volume at 40 atma and 70° K. is just above its dew-point. At 45 atma and 70° K. an $H_2/N_2$ mixture containing 94.0% $H_2$ will be below its dew-point. This results in liquid droplets forming somewhere between the center of the centrifuge and the circumference or at the circumference itself. Since then the centrifugal driving force will no longer depend on the difference of the molecular weights but on the difference in densities, these droplets will be thrown to, or gather on, the wall of the centrifuge and will rapidly form a liquid film on it. If the centrifuge has a cylindrical wall and is vertical, this film will thicken at the base and it will be possible to draw off liquid through small holes drilled in the bottom rim. However, if the centrifuge is slightly barrel-shaped, as hereinafter described, the film will be thickset at the point of maximum diameter, since the centrifugal forces greatly exceed the gravitational forces, and the holes may be located accordingly. It does not matter whether the droplets actually form in the gas space or whether they form along the circumferential wall. What matters is that they are present on the wall and may be drawn off. The liquid in equilibrium with the condensing vapor contains only a few percent of hydrogen, and the quantity of liquid to be drawn off is quite small - at most 2 percent of the feed gas. So the 98 percent mixture can now be separated into a relatively large stream containing over 99% $H_2$, and a very small stream containing most of the nitrogen and only an insignificant portion of the hydrogen.

Theoretically, the maximum purity of the recovered hydrogen is given by the separation factor and the dew-point composition at the relevant temperature and pressure. If this is 98 percent, then in the example given above:

$$= \frac{0.02(x')}{0.98(1-x')} = 3.1$$

$$\therefore \frac{x'}{1-x'} = \frac{2.94}{0.02} = 152$$

$$153 x' = 152$$

$$x' = 0.993 = 99.3\%$$

Though this high purity may not be realized in practice, a purity of 99 percent or slightly above is achievable in the circumstances set forth.

The above considerations apply to helium-containing gas mixtures also and similar calculations may be made for such mixtures. In general the process is operated at temperatures and pressures which represent the limits of purification, by the conventional low-temperature condensation process. For mixtures of hydrogen or helium containing nitrogen and which may also contain methane and/or carbon monoxide the temperatures would be between 64° and 110° K. and the pressures between 10 and 50 atm. abs.

Generally speaking, the process of the invention may advantageously be applied to the treatment of hydrogen or helium mixtures containing from 90 to 98 percent of hydrogen or helium. Such 90 to 98 percent mixtures may be obtained from available gas mixtures of lower hydrogen or helium content by the conventional low-temperature condensation processes and then subjected to the process of the invention. It has been found that by utilizing the process of the invention, the impurity content of the hydrogen or helium product can be reduced by a factor of about 2 to 3 depending on the pressure and temperature of operation of the centrifuge and on the nature of the impurity. Thus from a 97% $H_2$ containing $N_2$ as its major impurity a gas containing about 99% $H_2$ can be obtained in a single operation. Similarly from a 90% $H_2$, a 96–97% $H_2$ can be produced in a single operation. More than one treatment in the gas centrifuge may be applied but generally it will be found more convenient to recover a hydrogen or helium concentrate of from 95 to 98 percent purity by volume by the low-temperature condensation process and then subject the resulting concentrate to a single stage treatment in the gas centrifuge. Where still higher purities than are obtainable in the gas centrifuge are required the gas centrifuge treatment may be followed by a known adsorption or diffusion treatment, the cost of which is appreciably reduced with the reduction in the amount of impurity to be removed.

Figure 2:
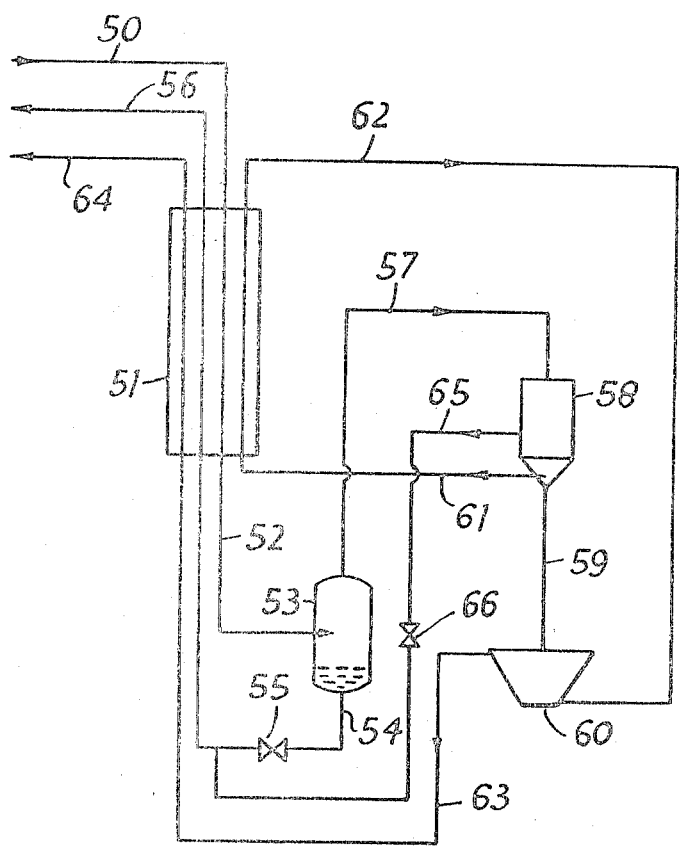

As indicated above the process of the invention may be combined with a low-temperature separation process to treat the product gas of the latter process and in such case the purified product from the gas centrifuge may advantageously be expanded through a gas expansion turbine for producing refrigeration required for the combined process. The gas turbine may advantageously be coupled to the gas centrifuge to drive the latter and the invention includes the combination of a gas expansion turbine and a gas centrifuge so arranged that the turbine drives the centrifuge. In the accompanying drawings, FIG. 1 and FIG. 2 are flow sheets of embodiments of the process of the invention described, by way of example, respectively in Examples 1 and 2 below and FIG. 3 is a sectional view illustrating the construction of one form of a combined gas expansion turbine and gas centrifuge according to the invention, which may be used in carrying out the process of the invention.

EXAMPLE I

In this example, the method described in British Patent Specification No. 1,057,020 modified by the use of a gas centrifuge in conjunction therewith will be described with reference to FIG. 1 of the accompanying drawings, as applied to the recovery of hydrogen from ammonia synthesis purge gas.

The purge gas is of the following composition:

|     | Mol % |
| --- | --- |
| $H_2$ | 69.0 |
| $N_2$ | 23.0 |
| A | 2.7 |
| $CH_4$ | 5.3 |

The purge gas available at a pressure of 135 kg./cm.$^2$ absolute and a temperature of 10° C. is expanded to a pressure of 70 kg./cm.$^3$ absolute and is then fed via line 7 through a molecular sieve adsorber 8 in which it is freed from water and final traces of ammonia. Two adsorbers may be used in alternating fashion as known, one being regenerated whilst the other is in service.

The purge gas leaving adsorber 8 by line 9 is expanded through an expansion valve 10 to a pressure 40 kg./cm.$^2$ absolute and is then fed via line 11 to heat exchanger 12. In passing through heat exchanger 12 the purge gas is cooled to 85° K. so that the greater part of the argon and methane and some of the nitrogen condense. The mixture of gas and condensed liquid is passed by line 13 to separator 14, in which the liquid fraction is separated. The residual gas mixture is then passed by line 15 to heat exchanger 16 through which it passes upwardly and in which it is further cooled to 70° K. with the result that the remaining traces of argon and methane and most of the nitrogen present condense and descend as reflux in contact with the rising gas. The condensate is collected in separator 17 below the heat exchanger 16. The residual hydrogen concentrate containing about 98% $H_2$ and 2% of $N_2$ leaving the upper end of the heat exchanger 16 passes at 70° K. and 40 kg./cm.$^2$ absolute via line 18 into the gas centrifuge 19 which is rotating on the same shaft 20 as turbine 21. The gas centrifuge has a barrel-shaped basket 10 cm. long and with an internal diameter varying from 4.8 to 5.4 cm. The basket rotates about a coaxially arranged cylinder having an external diameter of 3.3 cm. The speed of rotation of the basket is 100,000 revs. per minute. Emerging from the centrifuge 19, the purified hydrogen which now contains less than 1% $N_2$ is passed via line 22 through heat exchanger 16, in which it is warmed to 83° K., and is then passed via line 23 through gas expansion turbine 21 in which it is expanded with the performance of external work to 14.5 kg./cm.² and cooled to 64° K. This very cold hydrogen is then passed via line 24 downwardly through heat exchanger 16 and then passed via line 25 to heat exchanger 12 in which it is warmed to close to 10° C. and is then collected as product. The condensate from separator 17 is passed through expansion valve 26 in which it is expanded to close to 1 kg./cm.² absolute and then via line 27 to pass downwardly through heat exchanger 16 in which it evaporates to assist in cooling the rising gas by indirect heat exchange. The evaporated condensate leaving heat exchanger 16 is passed by line 28, in which it is joined by expanded condensate from separator 14, which has passed through expansion valve 29, and the mixture is then passed through heat exchanger 12, in which liquid present in the mixture is evaporated, to assist in cooling by indirect heat exchange the incoming purge gas mixture. Liquid collected in centrifuge 19 is expanded through valve 30 to close to 1 kg./cm² absolute and passed via line 31 to join the liquid in line 27 and be evaporated therewith in passing through heat exchanger 16.

The temperature in the gas centrifuge is kept constant by controlling the pressure upstream of the valve 30. Thus, using a centrifuge of the form described below and shown in FIG. 3 the pressure in the annular space surrounding the basket 34 and enclosed by casing 45 is controlled for this purpose.

EXAMPLE 2

This Example, which will be described with reference to FIG. 2 of the accompanying drawings, illustrates the recovery of helium from a natural gas of the following composition:

|     | Vol % |
|-----|-------|
| He  | 0.8   |
| $N_2$ | 8.7 |
| $CH_4$ | 90.5 |

This gas, compressed to 20 atm. absolute is initially concentrated in known manner by cooling in a separate plant (not shown) to 110° K. Almost all the methane and some of the nitrogen is thereby removed by condensation and the gas leaving this plant at about 20 atm. absolute and 110° K. has the following composition:

|     | Vol % |
|-----|-------|
| He  | 11.2  |
| $N_2$ | 83.6 |
| $CH_4$ | 5.2 |

Referring to FIG. 2, this gas is passed via line 50 through heat exchanger 51 in which it is cooled to 80° K. by returning process streams. This results in the condensation of the residual methane and most of the nitrogen. The resulting gas and liquid phases are passed by line 52 into the separator 53 in which they are separated.

The liquid from separator 53 passes through line 54 and expansion valve 55, in which its pressure is reduced to 1.5 atm. absolute, to the exchanger 51, in passing through which it is completely evaporated and which it leaves at 100° K. through the line 56 to be returned through the previous plant (not shown).

The gas phase separated in separator 53 has the following composition:

|     | Vol % |
|-----|-------|
| He  | 95.6  |
| $N_2$ | 4.4 |
| $CH_4$ | —   |

This gas phase at 19 atm. absolute and 80° K. is passed via line 57 into the central part of gas centrifuge 58 which is similar in construction and dimensions to the centrifuge of Example 1 and is rotating on the same shaft 59 as gas expansion turbine 60 at 100,000 revolutions per minute.

Liquefaction of nitrogen occurs in the centrifuge 58 and the purified helium gas leaving the centrifuge through line 61 has the following approximate composition:

|     | Vol % |
|-----|-------|
| He  | 98.1  |
| $N_2$ | 1.9 |

This helium gas stream is warmed up in heat exchanger 51 to 100° K. and then passes via line 62 to the gas expansion turbine 60 in which it is expanded with the performance of external work to approximately 5 atm. absolute and cooled to a temperature of 70° K. The cold helium gas leaves the turbine through line 63 and is passed through heat exchanger 51, which it leaves by line 64 to pass to the previous plant referred to above. The expansion of the purified helium in the turbine produces the necessary refrigeration to maintain the required operating conditions of the plant shown in FIG. 2.

Liquid nitrogen withdrawn from the perimeter of the centrifuge 58 is passed through line 65 and expansion valve 66, in which it is expanded to 1.5 atm. absolute, and it is then mixed with the liquid from separator 53 downstream of the valve 55, to pass therewith through heat exchanger 51, in which it is evaporated.

The temperature in the centrifuge is kept constant by controlling the pressure upstream of the valve 66, as described in Example 1.

In FIGS. 1 and 2, the centrifuge (indicated by 19 and 58 respectively) is shown schematically as driven by the shaft of the gas turbine. However, the centrifuge basket may be formed as an extension of and an integral part of the turbine wheel. Such an arrangement is generally shown in FIG. 3, which illustrates a preferred form of combination of expansion turbine and gas centrifuge for use in carrying out the process of the invention. The turbine is an inward radial flow expansion turbine which can be operated at 100,000 revolutions per minute to pass about 3,000 SM.³/hour of gas.

Referring to FIG. 3, the combined apparatus is of generally cylindrical form and includes a turbine wheel 32 which drives shaft 33 and a centrifuge basket 34 which is carried by and rotates with the turbine wheel 32. The turbine wheel 22 is surrounded by a nozzle ring 35 through which gas is fed thereto in known manner. A central rotating tube 36 attached to the turbine wheel 32 carries away the exhaust gases to the outlet 37. A stationary tube 38 surrounds the tube 36 leaving an annulus through which the hydrogen feed entering at 39 passes into the centrifuge at 40. The light gas leaves at the other end 41 of the centrifuge and passes to outlet 42. The liquid droplets collect on the outer wall 43 of the centrifuge and pass through openings 44 into an annular space enclosed by an outer casing 45 to leave by outlet 46.

A small fraction of the power absorbed by the turbine is used in accelerating and separating the gases. The remaining power is rejected by a compressor (not shown) attached to the warm end of the shaft 33.

Labyrinth seals 47 and 48 are employed to prevent leakage of gas between the turbine and the annular space enclosed by casing 45 and between the outlet for the hydrogen and the said annular space. A bearing 49 is provided for the outlet end of tube 36 which acts in the dual role of support and seal.

The turbine wheel 33 may be made of aluminum or stainless steel, the centrifuge basket 35 may be made of stainless steel and the outer casing 45 of aluminum.

We claim:

1. A process of obtaining a gas of increased purity from a gaseous mixture consisting predominantly of said gas, said gas being selected from the group consisting of hydrogen and helium, which comprises introducing the gaseous mixture into the central part of a rotating gas centrifuge at a low temperature and superatmospheric pressure such that the gaseous mixture is above its dew point but passes through its dew-point as it is caused by centrifugal force to pass to the peripheral wall of the centrifuge with a resultant increase in pressure and decrease in the concentration of said gas, so that gaseous impurities are condensed and collect on said peripheral wall and a gas stream of increased purity containing said gas is recovered from the gas centrifuge.

2. A process according to claim 1, wherein the gaseous mixture introduced into the gas centrifuge contains from 90 to 98 percent by volume of said gas.

3. A process according to claim 2, wherein the said gaseous mixture contains nitrogen.

4. A process according to claim 2, wherein the said gaseous mixture is introduced into the gas centrifuge at a temperature of from 64 to 110° K. and a pressure of from 10 to 50 atmospheres absolute.

5. A process according to claim 1 wherein the said gaseous mixture is obtained from another gaseous mixture containing a lesser proportion of said gas by the separation of constituents other than said gas by low-temperature condensation in known manner.

6. A process according to claim 5, wherein said another gaseous mixture contains nitrogen and methane.

7. A process according to claim 5, wherein a gas expansion turbine is used to produce refrigeration for the process, the gas centrifuge is driven by the expansion turbine and the gas stream recovered from the gas centrifuge is expanded through the expansion turbine to produce the refrigeration required.

8. A process as claimed in claim 1 wherein the gas stream recovered from the gas centrifuge is further purified by being subjected to an adsorption process.

9. A process as claimed in claim 1 wherein the gas stream recovered from the gas centrifuge is further purified by being subjected to a diffusion process.

* * * * *